[12] United States Patent
Liu et al.

(10) Patent No.: US 6,746,273 B1
(45) Date of Patent: Jun. 8, 2004

(54) HIGH-SPEED SERIAL BUS POWER SUPPLY DEVICE

(76) Inventors: Wen-Tsung Liu, Fl. 5, No. 1, Lane 45, Pao-Shing Rd., HsinDian City, Taipei (TW); Hsiang-An Hsieh, Fl. 5, No. 1, Lane 45, Pao-Shing Rd., HsinDian City, Taipei (TW); Wei-Yueh Chien, Fl. 5, No. 1, Lane 45, Pao-Shing Rd., HsinDian City, Taipei (TW)

( * ) Notice: Subject to any disclaimer, the term of this patent is extended or adjusted under 35 U.S.C. 154(b) by 2 days.

(21) Appl. No.: 10/243,673

(22) Filed: Sep. 16, 2002

(30) Foreign Application Priority Data

Jun. 26, 2002 (TW) .................................. 091209659 U

(51) Int. Cl.[7] .............................................. H01R 11/00

(52) U.S. Cl. ..................................................... 439/502

(58) Field of Search ................................. 439/502, 153, 439/162, 259, 265, 606

(56) References Cited

U.S. PATENT DOCUMENTS

| | | | | |
|---|---|---|---|---|
| 5,040,993 A | * | 8/1991 | Krug et al. | 439/75 |
| 5,509,811 A | * | 4/1996 | Homic | 439/55 |
| 6,087,804 A | * | 7/2000 | Suda | 320/106 |
| 6,246,578 B1 | * | 6/2001 | Wei et al. | 361/686 |
| 6,431,892 B1 | * | 8/2002 | Shupe et al. | 439/188 |
| 6,623,295 B2 | * | 9/2003 | DeLadurantaye, III | 439/502 |
| 6,672,896 B1 | * | 1/2004 | Li | 439/502 |

* cited by examiner

Primary Examiner—Dean A. Reichard
Assistant Examiner—Adolfo Nino

(57) ABSTRACT

The present invention discloses a high-speed serial bus power supply device to connect a 4-PIN cable receptacle and a USB interface socket on a notebook. It includes a first connector, which is a common 6-PIN cable receptacle and can be connected to an appropriate interface; a second connector, which is a 4-PIN cable plug connected to the first connector and can be inserted into the said 4-PIN cable receptacle of the notebook; and a USB plug, which is also connected to the first connector and can deliver power to the serial port through said USB interface socket which is connected to the notebook.

1 Claim, 3 Drawing Sheets

HIGH-SPEED SERIAL BUS POWER SUPPLY DEVICE

FIELD OF THE INVENTION

The present invention relates generally to a high-speed serial bus, and more particularly to a high-speed serial bus power supply device.

BACKGROUND OF THE INVENTION

Interface 1394 is a high-speed serial bus standard introduced by Apple Computer. In 1995, it was certificated by IEEE. Apple named it as FireWire; while Sony named it as i.Link, hereunder we call it IEEE 1394 in general. An IEEE 1394 interface supports Plug-and-Play and Hot-Plug, which means new devices can be added and then detected by the system without system shutdown. Such an interface is featured with high bandwidth, low power consumption, small size, simple and easy-to-use 4-PIN cable or 6-PIN cable, peer-to-peer data transfer and broadcast, and multi-functional synchronous or asynchronous data transfer, etc. The interface not only saves partial cost for the system, but most importantly, it delivers a common connection approach to computer devices and consumer audio/video instruments.

In addition, a computer with IEEE 1394 interfaces enables:

1. high speed communication: IEEE 1394 enables the data transfer rate up to 400 Mbps, which is much higher than that of an IDE bus (100 MB/s currently) and an SCSI bus (Ultra3 Wide SCSI, 160 MB/s). IEEE 1394 can be used to connect high-speed peripheral equipments, such as HDDs, CD-ROM drives, DVD drives, and Recordable Drives.
2. dynamic addressing: No manual address switching is needed. Therefore, no risk of address collision exists.
3. up to 63 peripheral devices to be connected.
4. the maximum length of cable permissible to reach 4.5 meters.

As described above, an IEEE 1394 interface employs a 6-PIN cable and a 4-PIN cable for power supply signals and non-power supply signals, respectively. The 4-PIN cable is mainly designed to connect to a notebook. However, because the 4-PIN cable doesn't involve power supply PINs, a dedicated adapter and a power supply unit shall be used together with IEEE 1394 when a notebook is to be connected. Such a design not only increases the total cost, but also results in inconvenience.

SUMMARY OF THE INVENTION

To solve above problems and attain other efficacies and purposes, the present invention discloses a high-speed serial bus power supply device, which delivers power to the IEEE 1394 interface through the leads of a USB interface in the notebook.

The inventor has been engaged in the development of computer peripheral equipments for years and introduced a "High-Speed Serial Bus Power Supply Device" to solve above problems.

The technologies and features involved in the present invention can be further detailed in the following illustrations and descriptions.

| | |
|---|---|
| High Speed Serial Bus Power Supply Device | 10 |
| First Connector | 12 |
| USB Plug | 14 |
| Second Connector | 16 |
| Notebook | 100 |
| USB Interface Socket | 104 |
| 4-PIN Cable Receptacle | 106 |

DETAILED DESCRIPTION OF THE PREFERRED EMBODIMENT

Figure 1:
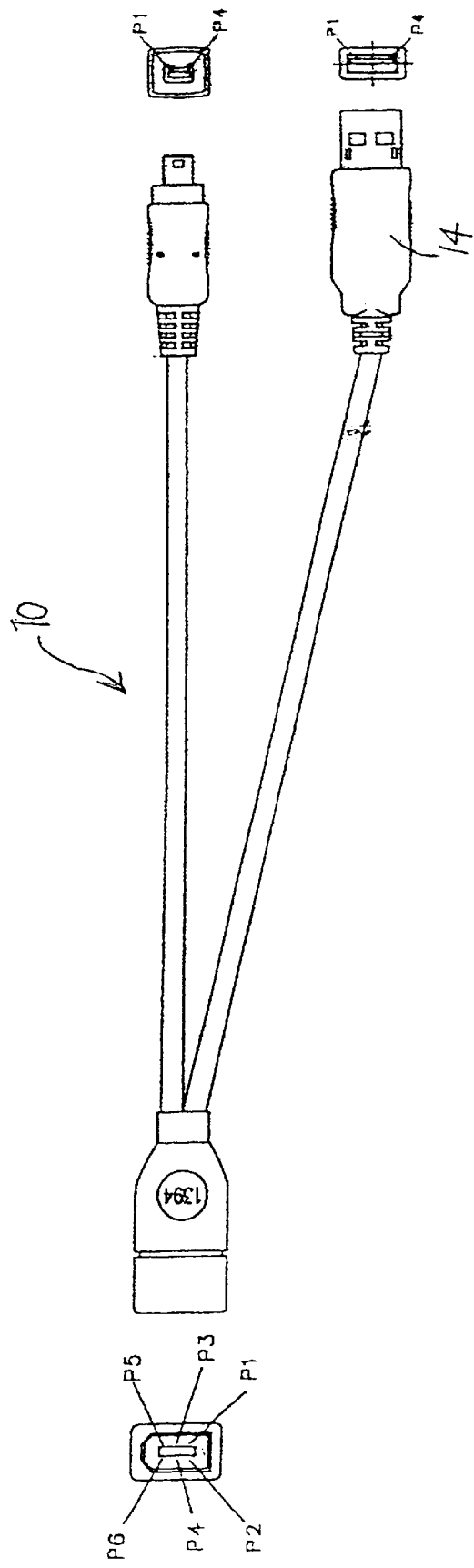
FIG. 1 is a 3D sketch map of an embodiment implemented according to the present invention.

Please see FIG. 1, a 3D sketch map of an embodiment implemented according to the present invention. The high-speed serial bus power supply device 10 adds a USB interface plug on a common cable.

Figure 2:
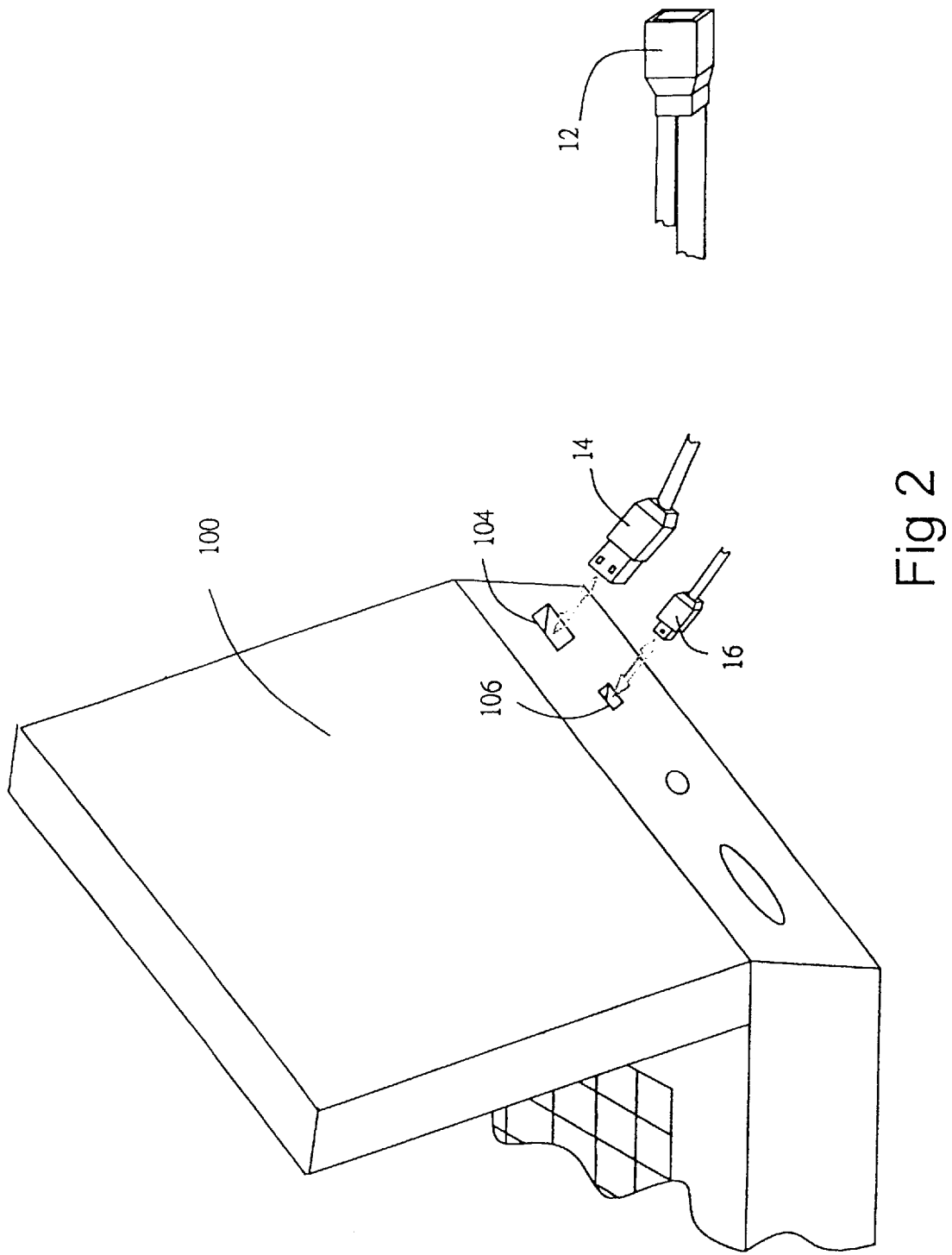
FIG. 2 is a sketch map of a preferred embodiment implemented according to the present invention.

Please see FIG. 2, a preferred embodiment implemented according to the present invention. The present invention is mainly designed for a 4-PIN cable receptacle 106 and a USB interface socket 104, which are used in notebooks. The present invention is featured with:

the first connector 12, which is a 6-PIN cable receptacle that can be connected to an appropriate interface;

the second connector 16, which is a 4-PIN cable plug connected to the first connector 12 and can be inserted into the 4-PIN cable receptacle 106 in the notebook 100, and;

a USB plug, which is also connected to the first connector 12 and can deliver power to the serial bus interface through the USB interface socket 104 in the notebook 100.

It should be noted that the high-speed serial bus refers to an IEEE 1394 interface in the notebook 100.

Figure 3:
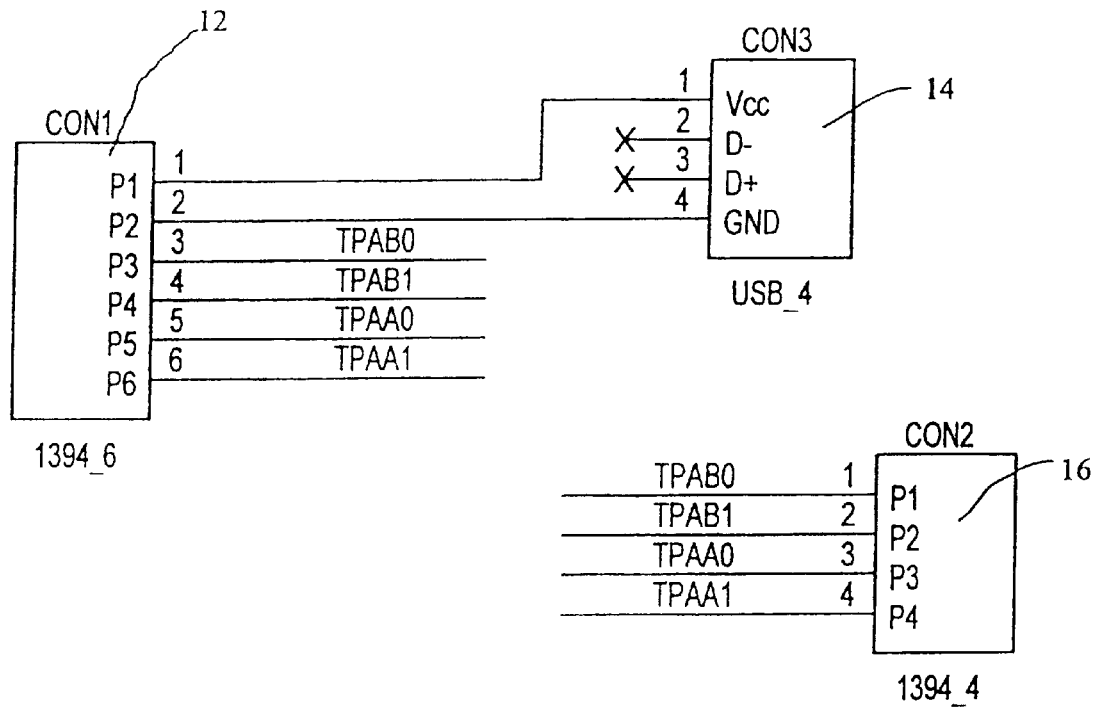
FIG. 3 is a circuit diagram of the present invention.

Please see FIG. 3, a circuit diagram of the present invention. In the invention, the power is delivered through two PINs (i.e., VCC and GND) in the USB plug 14 and the remainder two PINs (D+ and D−) are cut off. VCC and GND are connected to P1 and P2 PINs of the first connector 12, respectively. The remainder PINs of the first connector 12 will be connected to P1~P4 of the second connector 16.

In conclusion, the high-speed serial bus power supply device gives the following benefits: to deliver direct power supply to an IEEE 1394 interface from the notebook through the leads of USB interface, which solves the problem of power supply to IEEE 1394; to decrease the cost; to bring more convenience to users and to eliminate additional devices (adaptors or power supply units).

Though the technologies adopted in the present invention is not complicated, there is no such design by now, and it is innovative and practical. Hence the inventor applies for a new patent with it.

The names of components in above embodiments are only for description and shall not constitute any limitation to the present invention. Any embodiment implemented according to the present invention with equivalent variations or modifications shall fall into the category of the present invention.

What is claimed is:

1. A high-speed serial bus power supply device, comprising:

a first connector with IEEE 1394 interface, being a 6-pin cable receptacle for being connected to an interface corresponding to the first connector;

a second connector, being a 4-pin cable plug and connected to the first connector via a cable; and a USB plug, being connected to the first connector via another cable;

characterized in that the USB plug provides a Vcc pin and a GND pin being electrically joined to two of the 6 pins in the first connector and the second connector being electrically joined to rest four pins of the first connector;

whereby, the second connector can be inserted into a 4-pin cable socket of a notebook for signal transmission and the USB connector can be inserted into a USB interface socket for power supply.

* * * * *